United States Patent
Mishra et al.

(10) Patent No.: US 11,175,150 B2
(45) Date of Patent: Nov. 16, 2021

(54) VEHICLE PATH CONTROL

(71) Applicant: Ford Global Technologies, LLC, Dearborn, MI (US)

(72) Inventors: Subhransu Mishra, Santa Clara, CA (US); Matthew Atwood Whitaker, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 16/739,440

(22) Filed: Jan. 10, 2020

(65) Prior Publication Data

US 2021/0215490 A1    Jul. 15, 2021

(51) Int. Cl.
*G01C 21/34* (2006.01)
*G01C 21/36* (2006.01)

(52) U.S. Cl.
CPC ..... *G01C 21/3415* (2013.01); *G01C 21/3614* (2013.01)

(58) Field of Classification Search
CPC ............ G01C 21/3415; G01C 21/3614; G01C 21/3664
See application file for complete search history.

(56) References Cited

U.S. PATENT DOCUMENTS

| | | | |
|---|---|---|---|
| 6,680,674 B1 | 1/2004 | Park | |
| 7,706,973 B2 | 4/2010 | McBride et al. | |
| 8,126,641 B2 | 2/2012 | Horvitz | |
| 8,996,295 B2 | 3/2015 | Tate, Jr. | |
| 9,103,671 B1 | 8/2015 | Breed et al. | |
| 9,261,377 B2 | 2/2016 | Krzanowski et al. | |
| 9,671,246 B2 | 6/2017 | Boschker et al. | |
| 9,816,827 B1 | 11/2017 | Slusar | |
| 10,036,639 B1 | 7/2018 | Cox et al. | |
| 10,323,951 B2 | 6/2019 | Goyal | |
| 10,331,141 B2 | 6/2019 | Grimm et al. | |
| 2003/0182052 A1 | 9/2003 | DeLorme et al. | |
| 2004/0172192 A1 | 9/2004 | Knutson | |
| 2007/0282521 A1 | 12/2007 | Broughton | |
| 2010/0205060 A1* | 8/2010 | Athsani ................. | G06Q 30/02 705/14.58 |
| 2011/0301830 A1 | 12/2011 | Tate, Jr. | |
| 2012/0029821 A1 | 2/2012 | Nesbitt | |
| 2014/0156188 A1 | 6/2014 | Hart et al. | |
| 2014/0229101 A1* | 8/2014 | Glaser ................ | G01C 21/3614 701/487 |
| 2018/0011489 A1* | 1/2018 | Oba ..................... | B62D 15/025 |
| 2018/0231390 A1 | 8/2018 | Rowley et al. | |
| 2019/0146508 A1 | 5/2019 | Dean et al. | |

* cited by examiner

*Primary Examiner* — Anne Marie Antonucci
(74) *Attorney, Agent, or Firm* — Frank A. MacKenzie; Bejin Bieneman PLC (57) ABSTRACT

A system includes a computer that includes a processor and a memory. The memory stores instructions executable by the processor to receive an input route from a user device, wherein the input route is determined by user input tracing the input route on a display of a map on the user device, to specify a travel route for a vehicle, including a direction of movement of the vehicle, based on the input route received from the user device, and upon determining that the vehicle specified travel route is within a specified distance of the input route, to adjust the travel route based on vehicle sensor data, a destination of the input route, and a time of day, thereby outputting an adjusted travel route.

18 Claims, 5 Drawing Sheets

VEHICLE PATH CONTROL

BACKGROUND

A computer may operate an autonomous vehicle to navigate the vehicle to a destination based on map data and vehicle sensor data. The computer typically uses map data and user input to identify a route to a destination. User input may include location coordinates of a destination such as a building, etc. A destination may be an approximate location e.g., a reference point or other approximation for a landmark such as a mall, office building, campus, etc., The computer may need to identify a suitable pickup, drop off, etc., location based on the provided destination. However, the computer may fail to identify a route and/or select a drop off or pick up location at the specified destination, because of an inability to determine the route and/or drop off or pick up location. Further, the computer may fail to identify a suitable route because of an inability to utilize map data including the destination location.

DETAILED DESCRIPTION

Introduction

Herein a system is disclosed, comprising a computer that includes a processor and a memory. The memory stores instructions executable by the processor to receive an input route from a user device, wherein the input route is determined by user input tracing the input route on a display of a map on the user device, to specify a travel route for a vehicle, including a direction of movement of the vehicle, based on the input route received from the user device, and upon determining that a vehicle specified travel route is within a specified distance of the input route, to adjust the travel route based on vehicle sensor data, a destination of the input route, and a time of day, thereby outputting an adjusted travel route.

The travel route for the vehicle may be further based on metadata including at least one of the direction of movement, a time range, a weekday, an access restriction status, a parking permission status, and a vehicle type, and the instructions may further include instructions to specify the metadata of the specified route based on the input received from a user interface device.

The metadata may further include one or more stored trip types including at least one of a drop off, a pick-up, a drive through, accommodating a user disability, and delivering an object, and the instructions may further include instruction to determine a trip type for the vehicle; to select an input route from the plurality of the input routes based on the determined trip type, a planned time of travel, travel data including vehicle user data, and the stored trip type included in the metadata of the plurality of input routes; and to specify the travel route based on the selected input route determined trip type.

The instructions may further include instructions to determine the trip type based on user data, a detected object in the vehicle, or a received navigation instruction from a remote computer.

Each of the plurality of specified input routes may be specified for a time range.

Each of the plurality of specified input routes may be specified for one or more types of vehicles.

The instructions may further include instructions to adjust the travel route such that the adjusted travel route is feasible by the vehicle based on a minimum navigable steering curvature radius of the vehicle.

The instructions to operate the vehicle on the adjusted travel route may further include instructions to actuate the vehicle to deviate from the adjusted travel route, upon determining, based on the vehicle sensor data, that the adjusted travel route is not navigable.

The instructions may further include instructions to output the adjusted travel route to a user interface device and, upon receiving an approval, smooth the adjusted travel route using a smoothing technique, and store the smoothed and adjusted travel route in a remote computer.

The system may further include a second computer, in a second vehicle, programmed to identify a second travel route to the destination within the area based on the smoothed and adjusted travel route stored in the remote computer, and further based on a time range of day, a type of the second vehicle, and to operate the second vehicle based on the second travel route.

The input route may include (i) location coordinates of a plurality of waypoints, and (ii) route-based metadata including a direction of movement, a time range, one or more use cases.

The instructions may further include instructions to specify the travel route for the vehicle based on the minimum navigable steering curvature radius of the vehicle, and to navigate the vehicle based on the travel route while adjusting the travel route based on object detection sensor data received from a vehicle sensor.

Further disclosed herein is a method, comprising receiving an input route from a user device, wherein the input route is determined by user input tracing the input route on a display of a map on the user device, specifying a travel route for a vehicle, including a direction of movement of the vehicle, based on the input route received from the user device, and upon determining that a vehicle specified travel route is within a specified distance of the input route, adjusting the travel route based on vehicle sensor data, a destination of the input route, and a time of day, thereby outputting an adjusted travel route.

The method may further include specifying metadata of the specified route based on the input received from a user interface device, wherein the travel route for the vehicle is further based on metadata including at least one of the direction of movement, a time range, a weekday, an access restriction status, a parking permission status, and a vehicle type.

The method may further include determining a trip type for the vehicle, selecting an input route from the plurality of the input routes based on the determined trip type, a planned time of travel, travel data including vehicle user data, and the stored trip type included in the metadata of the plurality of input routes, and specifying the travel route based on the selected input route determined trip type, wherein the metadata further include one or more stored trip types including at least one of a drop off, a pick-up, a drive through, accommodating a user disability, and delivering an object.

The method may further include determining the trip type based on user data, a detected object in the vehicle, or a received navigation instruction from a remote computer.

Each of the plurality of specified input routes may be specified for one or more types of vehicles and time ranges.

The method may further include adjusting the travel route such that the adjusted travel route is feasible by the vehicle based on a minimum navigable steering curvature radius of the vehicle.

The method may further include operating the vehicle on the adjusted travel route by actuating the vehicle to deviate from the adjusted travel route, upon determining, based on the vehicle sensor data, that the adjusted travel route is not navigable.

The method may further include outputting the adjusted travel route to a user interface device and, upon receiving an approval, smooth the adjusted travel route using a smoothing technique, and store the smoothed and adjusted travel route in a remote computer.

Further disclosed is a computing device programmed to execute any of the above method steps.

Yet further disclosed is a computer program product, comprising a computer-readable medium storing instructions executable by a computer processor, to execute any of the above method steps.

Exemplary System Elements

As disclosed herein, a user device can store routes within an area and also data about (i.e., metadata) for each route, as provided by user input, e.g., metadata can include type of vehicle that can traverse an input route, time of day during which a route can be traversed, user authorizations for each route, etc. Therefore, the present disclosure advantageously overcomes shortcomings in a computer's ability to determine a route and/or utilize map data.

A vehicle can include a computer programmed to receive an input route to a vehicle destination, wherein the input route is specified by user input to a user device tracing the input route on a display of the map on the user device. The vehicle computer can be programmed to then, based on the input route received from the user device, specify a travel route for a vehicle, including a direction of movement of the vehicle. The computer can be further programmed to adjust the travel route based on vehicle sensor data, a destination of the travel route, and a time of day, thereby outputting an adjusted travel route, upon determining that the vehicle specified travel route is within a specified distance of the travel route specified based on the input route.

Figure 1:
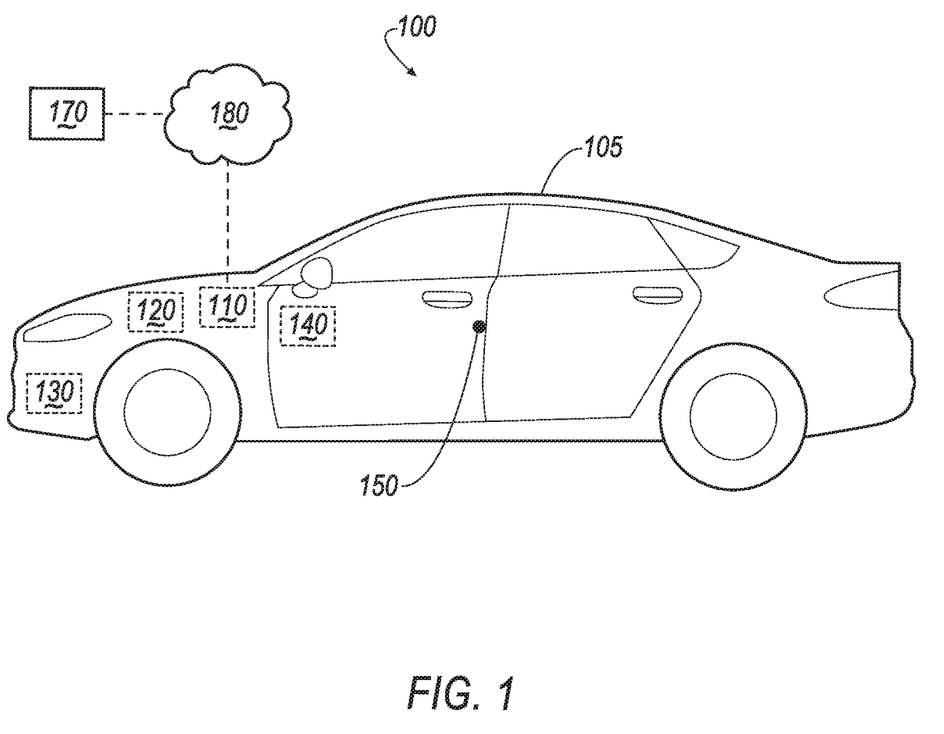
FIG. 1 is a block diagram of an exemplary system for navigating a vehicle.

FIG. 1 illustrates a vehicle system 100. The system 100 includes a vehicle 105, which may be powered in a variety of ways, e.g., with an electric motor and/or internal combustion engine. The vehicle 105 may be a land vehicle such as a car, truck, etc. A vehicle 105 may include a computer 110, actuator(s) 120, sensor(s) 130, and an HMI 140. The vehicle 105 can have a reference point 150, e.g., a geometrical center where a longitudinal axis and a lateral axis of a vehicle 105 body intersect.

The computer 110 includes a processor and a memory such as are known. The memory includes one or more forms of computer-readable media, and stores instructions executable by the computer 110 for performing various operations, including as disclosed herein.

The computer 110 may operate the vehicle 105 in an autonomous mode, a semi-autonomous mode, or a non-autonomous mode. For purposes of this disclosure, an autonomous mode is defined as one in which each of vehicle 105 propulsion, braking, and steering are controlled by the computer 110; in a semi-autonomous mode the computer 110 controls one or two of vehicle 105 propulsion, braking, and steering; in a non-autonomous mode, an operator controls the vehicle 105 propulsion, braking, and steering. In a non-autonomous mode, a vehicle 105 driver operates the vehicle 105 propulsion, braking, and steering. A mode of operation of a vehicle 105 may be selected based on an input received from the HMI 140 and/or an instruction received from a remote computer.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle 105 such as a controller area network (CAN) or the like, and/or other wired and/or wireless mechanisms.

Via the vehicle 105 network, the computer 110 may transmit messages to various devices in the vehicle and/or receive messages from the various devices, e.g., an actuator 120, an HMI 140, etc. Alternatively or additionally, in cases where the computer 110 actually comprises multiple devices, the vehicle 105 communication network may be used for communications between devices represented as the computer 110 in this disclosure. As discussed further below, various electronic controllers and/or sensors 130 may provide data to the computer 110 via the vehicle communication network.

The computer 110 may be configured for communicating through a wireless interface, with a remote computer 170 via, e.g., a vehicle-to-vehicle and/or vehicle-to-infrastructure communication network 180. The wireless communication network 180 represents one or more mechanisms by which devices such as a vehicle 105 computers 110 may communicate with the remote computer 170, and may be one or more of wireless communication mechanisms, including any desired combination of wireless (e.g., cellular, wireless, satellite, microwave and radiofrequency) communication mechanisms and any desired network topology (or topologies when multiple communication mechanisms are utilized). Exemplary V-to-V (or V2V) communication networks include cellular, Bluetooth, IEEE 802.11, dedicated short-range communications (DSRC), and/or wide area networks (WAN), including the Internet, providing data communication services. The wireless interface may include known electronic circuitry such as a radio frequency transmitter, a radio frequency receiver, and an amplifier circuit to boost an outgoing and incoming radio-frequency signal.

The remote computer 170 (or a manager computer 170) is a computer with a processor and a memory such as are known that is typically located outside the vehicle 105, e.g., a desktop or laptop computer, or possibly a portable computing device such as a smartphone or tablet. Further, the memory includes one or more forms of computer-readable media, and stores instructions executable by the processor for performing various operations, including as disclosed herein.

The vehicle 105 actuators 120 are implemented via circuits, chips, or other electronic and/or mechanical components that can actuate various vehicle subsystems in accordance with appropriate control signals, as is known. The actuators 120 may be used to control vehicle 105 systems such as braking, acceleration, and/or steering of the vehicles 105.

Vehicle 105 sensors 130 may include a variety of devices known to provide data via the vehicle 105 network. For example, the sensors 130 may include one or more camera, radar, and/or LIDAR sensors 130 disposed in and/or on the vehicle 105 providing data encompassing at least some of the vehicle 105 exterior. The data may be received by the computer 110 through a suitable interface such as in known. A sensor 130 disposed, e.g., on a top of the vehicle 105, may provide object data, i.e., data including relative locations, sizes, and/or shapes, etc., of objects such as other vehicles 101 surrounding the vehicle 105. A vehicle 105 computer 110 may receive the object data and operate the vehicle 105 in an autonomous and/or semi-autonomous mode based at least in part on the received object data. A vehicle 105 occupancy sensor 130, e.g., an occupancy sensor disposed in a vehicle 105 seat, etc., may provide data including whether a vehicle 105 user has departed the vehicle 105. Additionally or alternatively, the computer 110 may determine whether an object, e.g., a package, is in a vehicle 105 interior based on data received from one or more camera sensors 130 with a field of view including the vehicle 105 interior.

The HMI 140 may be configured to receive user input, e.g., during operation of the vehicle 105. For example, a user may select a mode of operation, e.g., an autonomous mode, by inputting a requested mode of operation via an HMI 140, and/or may enter location coordinates of a user destination. As one example, an HMI 140 may include touchscreens, buttons, knobs, keypads, microphones, and so on for receiving information from a user.

A vehicle trip, i.e., operation of the vehicle from a specified origin to a specified destination, may be of one or more different types. In the present context, a trip type specifies an objective of a trip. For example, a trip type may specify a drop-off, a pick-up, a drive-through, accommodating a user disability whether an occupant and/or an object, e.g., a package is transported, etc.

The computer 110 may be programmed to determine a trip type based on data received from the vehicle 105 HMI 140, a remote computer 170, etc. The received data may include occupant data, object data, and/or destination data. Occupant data may specify whether the occupant is a visitor, a customer, an employee, etc., at the destination. Table 1 shows an example set of data specifying an occupant. For example, occupant data may specify whether the occupant travels to a shopping mall for shopping, an office for work as an employee, and/or whether the occupant has mobility restrictions, e.g., disability. The received object data may specify an object destination, e.g., a merchandise return center at a mall, dimensions of the object, weight of object, etc. The destination data may include location coordinates, e.g., Global Positioning System (GPS) coordinates, of the destination, an identifier of the destination, e.g., a store name, etc.

TABLE 1

| User datum | Description |
| --- | --- |
| User type | Specifying a relationship of user to a destination, e.g., customer, employee, delivery person, etc. |
| Occupant restrictions status | Specifying whether vehicle occupant has mobility restrictions, e.g., disabled occupant requiring a wheelchair, escalator, lift, etc. |

Figure 2A:
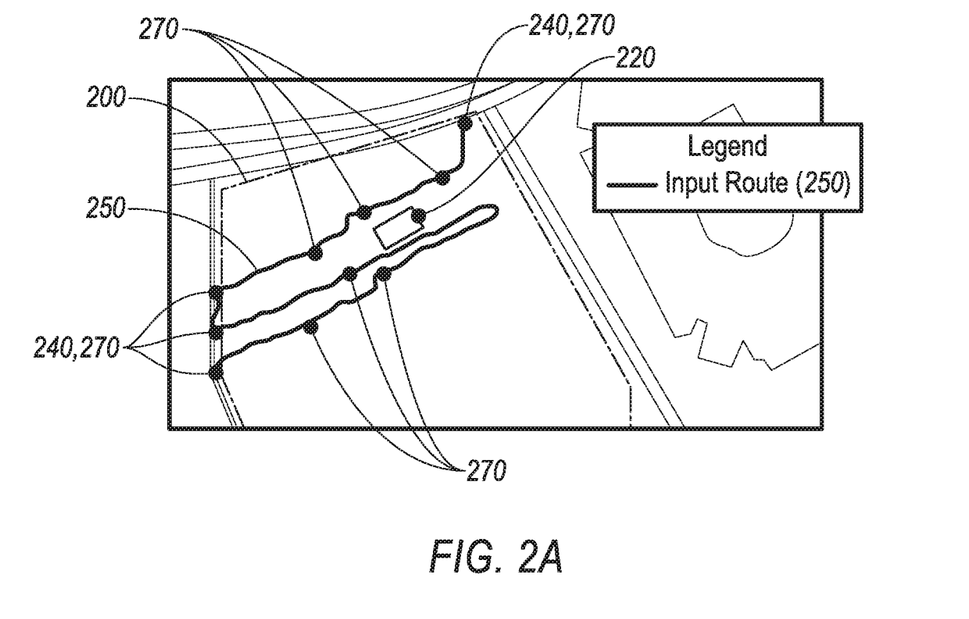
FIG. 2A shows an area with multiple input routes drawn on a map.
Figure 2B:
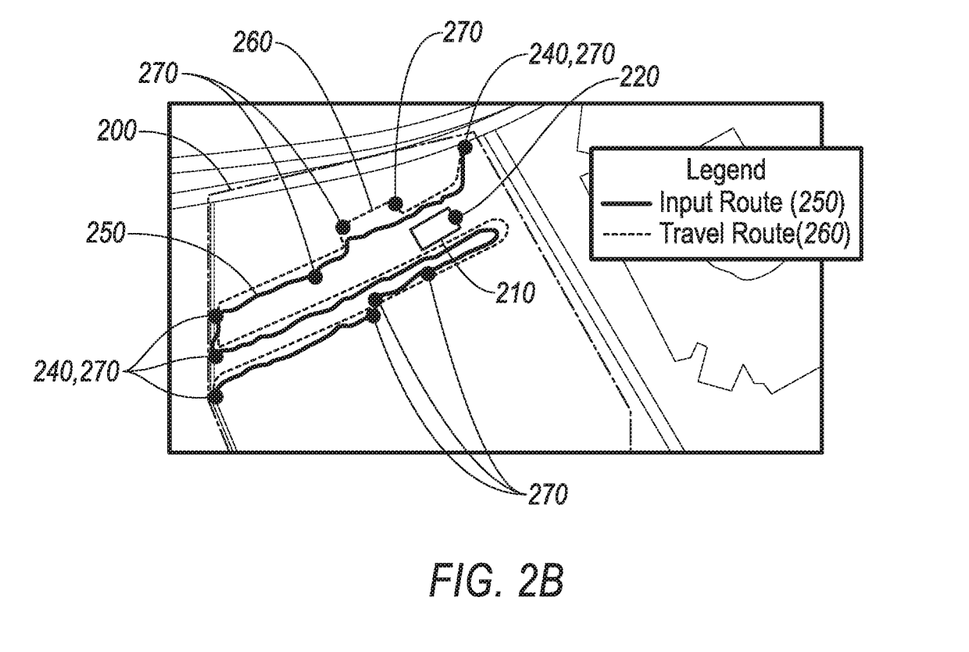
FIG. 2B shows the area of FIG. 2A including input routes and travel routes.

With reference to FIGS. 2A-2B, a computer, e.g., a vehicle 105 computer 110, can be programmed to receive an input route 250 (FIG. 2A) from a remote computer 170. The input route 250 is a straight and/or curved line drawn on a map of the area 200, based on user input tracing on a display, to be traversed by the vehicle 105 in the area 200.

An area 200, in the present context, is a two-dimensional geographical area on a ground surface such as a college campus, shopping mall parking area, a business district, a job site, a company campus, etc. An area 200 may have multiple roads and/or parking areas on which a vehicle 105 can navigate and/or park. An area 200 may have one or more entry and exit points 240. An entry or exit point 240 is a location through which a vehicle 105 can drive into or out of the area 200, e.g., opening around a parking area 200 from a public road or high way to allow the vehicles 105 enter or exit the area 200. Alternatively, an area 200 may be a building structure 210 (i.e., lacking a ground surface area such as a parking area surrounding the destination 210) with one or more access points 240.

A destination 210 may be a structure such as a building, e.g., an office building, a store, etc. A destination 210 may have one or more access points 220 such as exit and/or entry doors, gates, etc. A destination 210 location may be specified, for example, by GPS location coordinates of an access point 220. For example, an access point 220 may be a customer entrance, an employee access, a delivery entrance, a drive-through entrance, an entrance adjusted to comply with the needs of users with physical restrictions, e.g., having wheelchair ramp, etc.

A travel route 260 is a straight or curved line on the ground surface that a projection of a vehicle 105 reference point 150 on the ground surface traverses to reach a planned destination 210 in the area 200. A travel route 260 may be on a road within the area 200, and/or on any paved or unpaved surface within the area 200, e.g., a parking area.

For example, a user with access to provide input concerning the area 200 may input data via a mobile device computer 170, by tracing with a finger, pen, etc., on a display, e.g., a touch-screen, while a map of the area 200 is displayed on a display of the device computer 170. The computer 170 may store the input route 250 in a computer 170 memory by storing location coordinates, e.g., GPS coordinates, of a plurality of input route 250 waypoints 270 in a computer 170 memory. A waypoint 270 is a point on an input route 250 or a travel route 260 on the ground surface. For example, the computer 170 may be programmed to store location coordinates of waypoints 270 uniformly distributed along the input route 250, e.g., every 10 meters (m). An input route 250 or a travel route 260 is a plurality of lines (straight and/or curved) where each line is determined by a waypoint 270, starting with a start waypoint 270, including intermediate waypoints 270, and ending with an end waypoint 270. In one example, as shown in FIGS. 2A-2B, an input route 250 may have a start waypoint 270 at an area 200 entry point 240 and an end waypoint 270 at another area 200 entry or exit point 240 or a destination 210 access point 220, etc.

The computer 110 can be programmed to specify a travel route 260 (FIG. 2B) for a vehicle 105, including a direction of movement of the vehicle 105, based on the input route 250 received from the user device computer 170. The computer 110 then actuates the vehicle 105 to traverse the travel route 260, however based on sensor 130 data, the travel route 260 may be adjusted, e.g., to avoid other objects in the area 200 such as pedestrians, other vehicles 105, etc. The computer 110 may be programmed to actuate the vehicle 105 to traverse the specified travel route 260 upon determining that the specified travel route 260 is within a specified distance of the input route 250 and otherwise disapprove the input route 250 and send a message to the remote computer including disapproval of the input route 250. The computer 110, can be programmed to adjust the travel route 260 based on the vehicle 105 sensor 130 data, a destination 210 of the route 230, and a time of day, thereby outputting an adjusted travel route 260. The computer 110 may be programmed to output the adjusted travel route 260 to the remote computer 170 upon determining that a vehicle 105 adjusted travel route 260 is within a specified distance (i.e., less than a correction threshold) of the specified travel route 260 specified based on the input route 250. A correction threshold is a distance, e.g., 10 m, of a waypoint 270 on the adjusted travel route 260 from a nearest point on the specified travel 260 that may not be exceeded. A correction threshold may be specified by the user of the remote computer 170 and may be stored in the remote computer 170.

In the present context, the input route 250 includes (i) a route identifier, (ii) location coordinates of a plurality of waypoints, and (iii) route-based metadata including a direction of movement, a time, one or more trip type, a weekday, an access restriction status, a parking permission status, and a vehicle type. Table 2 shows example metadata for a route 250. A travel route 260 for the vehicle 105 is further based on metadata including the direction of movement, a time range,

TABLE 2

| Metadata | Description |
| --- | --- |
| Direction | Entering area and/or exiting area |
| Time | Range of time during which it is permitted to traverse a respective route, e.g., 7 am-9 am. |
| Trip Type | As defined above, e.g., pickup occupant, pickup package, delivery package, drop off occupant, drive-through, accommodating a user disability, employee drop-off, customer drop off, employee pickup, customer pick up, etc. |
| Weekday | A day of the week and/or date associated with the route, i.e., a day on which the route may be traversed. |
| Speed range | A range of allowed maximum speed, e.g., less than 30 kilometers per hour (kph). Thus, a vehicle may traverse the respective route with a speed within the specified speed range. |
| Vehicle type | Type(s) of vehicle that can be accommodated for a route, typically associated with a trip type, e.g., truck type vehicle for store-delivery. |
| Access restriction | Whether respective route traverses through and/or ends at a location that requires access authorization, e.g., employee entrance, secured parking area, etc. |
| Parking permission | Whether vehicle can park along respective route, or a special permission is required for parking, e.g., vehicle cannot stay in the area between drop off and pickup of a user when no parking available. |

A computer, e.g., the remote computer 170, may be programmed to specify the metadata of the specified travel route 260 based on the input received from the user interface device, e.g., the remote computer 170. For example, the computer 170 may be programmed, upon drawing a route 250 on the display based on the user input, to output a list of metadata possibilities, e.g., time, vehicle type, access restrictions, weekday, direction, trip type, etc. The user can then select one or more metadata, e.g., a direction, from the example list shown in Table 2 and specify an input, e.g., entry or exit, etc., and/or select "vehicle type" and enter "truck," and/or select "trip type" and enter "drive-through." The computer 170 may be programmed to store the metadata for each input route 250 in a computer 170 memory.

Table 3 shows an example set of stored route 250 data in a computer 170 memory. The vehicle 105 computer 110 may be programmed to receive the stored input routes 250 data including the metadata from the remote computer 170, e.g., hand-held tablet, a cloud computer, etc.

TABLE 3

| Route identifier | | Data identifier | Data value |
| --- | --- | --- | --- |
| Route 1 | Waypoints | Longitudinal and lateral coordinates | List of coordinates for waypoints along the route |
| | Metadata | Direction | Entry |
| | | Times of availability | 8 am to 10 am |
| | | Trip type | Drop off, drive-through |
| | | Speed | Less than 30 kph |
| | | Vehicle type | Car, truck, etc. |
| | | Access restriction | No restriction |
| Route 2 | Waypoints | Longitudinal and lateral coordinates | List of coordinates for waypoints along the route |
| | Metadata | Direction | Entry or Exit |
| | | Times of availability | 10 pm to 7 am |
| | | Trip type | Delivery |
| | | Speed | Less than 50 kph |
| | | Vehicle type | Truck |
| | | Access restriction | Employee authorization required. |

As shown in example Table 3, based on the stored metadata, a time range, a type of vehicle 105, trip type, etc., may be specified for each route 250. The computer 110 may receive the stored data for input routes 250, e.g., as illustrated by Table 3. The computer 110 may be programmed, upon receiving an instruction to navigate the vehicle 105 in the area 200, to determine route parameters according to the metadata and, based on the determined route, parameters select a route 250 for vehicle 105 within the area 200. "Route parameters" are data specifying values for determining a route, including occupant data, time of planned travel, weekday of planned travel, requested speed, direction of planned travel, vehicle 105 type, etc. As an example, the computer 110 may be programmed, in accordance with an example Table 4, to determine the trip type based on the received instruction and vehicle 105 occupant data. Table 4 lists a set of example determined data from the received navigation instructions and respective selected trip type(s).

TABLE 4

| Selected trip type | Pre-condition for the selected trip type |
| --- | --- |
| Drive-through | Received data from HMI indicating the occupant plans a stop without exiting the vehicle. |
| Authorized drop off | Occupant data indicates an occupant is present in the vehicle having an authorization for a drop-off at a specified destination. |

TABLE 4-continued

| Selected trip type | Pre-condition for the selected trip type |
|---|---|
| Authorized pick up | Occupant data indicates an occupant is present in the vehicle having an authorization for a pick-up at a specified destination. |
| Delivery | Vehicle is a delivery vehicle, and received instruction includes package data specifying destination location for drop-off, and/or an object in the vehicle detected based on the vehicle object detection sensor data. |
| Accommodating user disability | User data include disability information, e.g., entered via the HMI 140 or included in a trip instruction received from a remote computer. |

The computer 110 may be programmed to select an input route 250 from multiple input routes 250 based on the determined trip type, a planned time of travel, travel data including vehicle user data, and the stored trip type included in the metadata of the plurality of input routes, and to specify the travel route 260 based on the selected input route 250 and the determined trip type. For example, FIG. 2A illustrates a first and a second input route 250. The computer 110 may be programmed to select one of the first or second input routes 250 based on the determined route parameters including trip type, the planned time of travel, planned direction of travel, etc.

For example, with reference to example Tables 3 and 4, the computer 110 may be programmed to identify a "drive-through" trip type upon determining based on the received instruction including data specifying a request of an occupant specifying no exit from the vehicle 105 at the destination 210, and to select the route 250 with the identifier "route 1" upon determining an arrival time of 9 am, a "car" vehicle 105 type and a planned vehicle 105 speed of 25 kph.

In another example, the computer 110 may select an input route 250 based on a received navigation instruction including a request to park the vehicle 105 (upon arrival and drop-off of the occupant) in a parking space within the area 200 for a specified time. The computer 110 may then determine, based on the selected input route 250, which specifies no parking restrictions along the input route 250, e.g., a parking space accessible on right or left of the selected input route 250. In another example, the computer 110, based on occupant data including authorization of the occupant to access restricted parking, may determine a parking space within a restricted portion of the area 200.

As illustrated in FIG. 2A, the input routes 250 may be input by a user tracing a finger, a pen or stylus, etc., on a display, etc., which may result in slightly zig-zag lines on the area 200 map representing a straight portion of a route 250, turns that may be too sharp, movements on a blocked area, e.g., sidewalk, etc., and/or going over obstacles, e.g., traffic signs, guardrail, etc.

As illustrated in FIG. 2B, a vehicle route 260 is determined based in part on a selected input route 250 to follow the input route 250 while taking into account other input parameters such as vehicle 105 physical properties, physical obstacles in the area 200, etc., and/or straightening the input routes 250, e.g., smoothing a slightly zig-zag line drawn on the area 200 to represent input routes 250. Vehicle 105 physical properties include vehicle 105 dimensions, a minimum navigable steering curvature radius, etc. The minimum navigable steering curvature radius is a radius of a curvature representing a sharpest turn the vehicle 105 steering components allow. The minimum navigable steering curvature radius may be defined based on the mechanical properties of the vehicle 105 steering actuator 120, vehicle 105 dimensions, etc., and can be stored in a memory of the computer 110, e.g., by a vehicle 105 manufacturer.

The computer 110 may be programmed to adjust the vehicle 105 travel route 260 by smoothing the input route 250 using smoothing techniques such as "line simplification" and/or "corner blending." The computer 110 may perform line simplification using conventional algorithms such as Ramer-Douglas-Peucker to remove unnecessary and/or unintended details while following the input routes 250, e.g., removing zig-zag movements as shown in FIG. 2B.

Turns along an input route 250 may be infeasibly sharp, i.e., may have a curvature radius less than the vehicle 105 minimum navigable curvature radius. The computer 110 may be programmed to perform corner blending by using conventional blending algorithms such as an Inserted Bezier Corner Blend to create a feasible vehicle route 260. "Feasible" in the present context means having a curvature radius exceeding the vehicle 105 minimum navigable curvature radius.

The computer 110 may be programmed to perform the smoothing of the travel route 260 based on a specified smoothing threshold. The smoothing threshold, in the present context, is a maximum distance, e.g., 2 m (meters), of a waypoint 270 on the travel route 260 from a nearest waypoint 270 on the input route 250.

The computer 110 may be programmed to specify the travel route 260 for the vehicle 105 by defining one or more lines or curves. As discussed above, each line or curve may include a starting waypoint 270, one or more intermediate waypoints 270, and an ending waypoint 270. The computer 110 may be programmed to identify waypoints 270 of the travel route 260 using line fitting techniques, smoothing techniques, etc. For example, the computer 110 may be programmed to identify a plurality of line or curves based on the minimum navigable steering curvature radius of the vehicle 105. The computer 110 can be further programmed to navigate the vehicle 105 based on the travel route 260 while adjusting the travel route 260 based on object data received from a vehicle sensor 130 and/or specified in map data. In other words, although the computer 110 determines the travel route 260 to follow a selected input route 250 by smoothing the input route 250 but while actuating the vehicle 105 actuators 120 to follow the travel route 260, the computer 110 may actuate the actuators 120 additionally based on sensor 130 data to avoid obstacles, etc., thus deviating from the specified travel route 260.

As discussed above, the computer 110 may select an input route 250 based on the route parameters and may specify the travel route 260 based on the selected input route 250. The computer 110 may specify the travel route 260 based on the selected input route 250 and based on map data. For example, the computer 110 may identify obstacles in the area 200 based on map data and specify the travel route 260 such that an obstacle is avoided, the vehicle 105 stays on a drivable surface, e.g., avoiding pedestrian sidewalk, and/or following traffic requirements, e.g., driving in a specified lane, in a specified direction, etc.

In addition to map data, the computer 110 may be programmed to identify obstacles, driving requirements, drivable surface, etc., based on data received from the vehicle 105 sensor 130, e.g., camera sensor 130, etc. For example, as shown in FIG. 2B, the computer 110 may adjust a travel route 260 that follows the input route 250 to avoid an obstacle that would block vehicle 105 progress on the input route 250. In the present context, an adjusted travel route 260 includes (i) a deviation from the input route 250 based on map data (i.e., as a part of specifying the travel route 260 prior to actuating the vehicle 105 to traverse the specified travel route 260), and/or (ii) an adjustment of the specified travel route 260 during traversing the travel route 260 based on vehicle 105 computer 110 actuations in response to the sensor 130 data (e.g., obstacle avoidance) and/or vehicle 105 operator inputs (if operated in non-autonomous mode) to, e.g., avoid obstacles, move on a drivable surface (e.g., avoiding sidewalk), etc.

Upon detecting an object on the travel route 260, the computer 110 may be programmed to operate the vehicle 105 based on the travel route 260 by actuating the vehicle 105 to deviate from the travel route 260. An input route 250 may be non-navigable. "Non-navigable" means that a distance of the adjusted travel route 260 at least at one waypoint 270 from the nearest waypoint 270 on a travel route 260 specified based on an input route 250 exceeds the correction threshold. If the computer 110 determines that a navigation of the vehicle 105 to follow the travel route 260 specified based on an input route 250 is non-navigable, e.g., because of an obstacle, the computer 110 may determine the respective input route 250 as "non-navigable." In one example, a user of the computer 170 may then modify the non-navigable input route 250 and repeat the steps stated above, e.g., sending a navigation request to the vehicle 105 to navigate based on the modified input route 250.

The computer 110 may be programmed to output the adjusted travel route 260 data to the remote computer 170. The remote computer 170, in response to receiving the adjusted travel route 260, sends one of an approval or disapproval (as discussed below) messages to the vehicle 105 computer 110. Alternatively, the remote computer 170 stores the received adjusted travel route 260 in the computer 170 memory upon approving the adjusted travel route 260. Thus, the input route 250 stored in the remote computer 170 may be replaced and/or updated by the adjusted travel routes 260. This replacing and/or updating typically includes updating coordinates of waypoints 270. Typically, the metadata stay unchanged through this updating process. For example, to update an input route 250, each waypoint 270 location coordinate of the input route 250 is replaced by waypoint 270 location coordinates of the received adjusted travel route 260.

Additionally or alternatively, the remote computer 170 may be programmed to apply smoothing algorithms or techniques to the adjusted travel routes 260 and store the smoothed and adjusted travel routes 260 in the remote computer 170 memory. The computer 110 may be programmed, upon receiving an approval message from the computer 170, e.g., based on user input, store the adjusted travel route 260 in a remote computer 170 memory. The computer 110 may be programmed to discard the adjusted travel route 260 data upon receiving a disapproval message from the remote computer 170.

In one example, the computer 110 may be programmed to determine that the adjusted travel route 260 is approved upon determining that a distance of each waypoint 270 on the adjusted travel route 260 to a nearest point on the specified travel route 260 is less than the correction threshold. In yet another example, the computer 110 may be programmed to determine that an adjusted travel route 260 is approved, upon determining that a distance of each waypoint 270 on the adjusted travel route 260 to a nearest point on the respective input route 250 is less than the correction threshold.

The computer 170 may be programmed, upon storing adjusted travel routes 260 in the remote computer 170 memory (i.e., updating or replacing the input routes 250), to send the updated and/or replaced input routes 250 data to other vehicles 105. The computer 170 may be further programmed to send data, stating that the respective input route 250 is approved, to other vehicles 105. Thus, a second vehicle 105 computer 110 can determine based on the received approval information that the input routes 250 has been travelled and adjusted.

A second vehicle 105 computer 110 may receive the updated input route 250 and to specify a second travel route 260 to a destination 210 of the second vehicle 105 based on the smoothed and updated input routes 250 stored in the remote computer 170. Additionally or alternatively, the second vehicle 105 computer 110 may adjust the second travel route 260 based on data received from the second vehicle 105 sensor(s) 130, e.g., obstacles that recently are placed on the stored travel routes 260 such as an object blocking the travel route 260.

Figure 3:
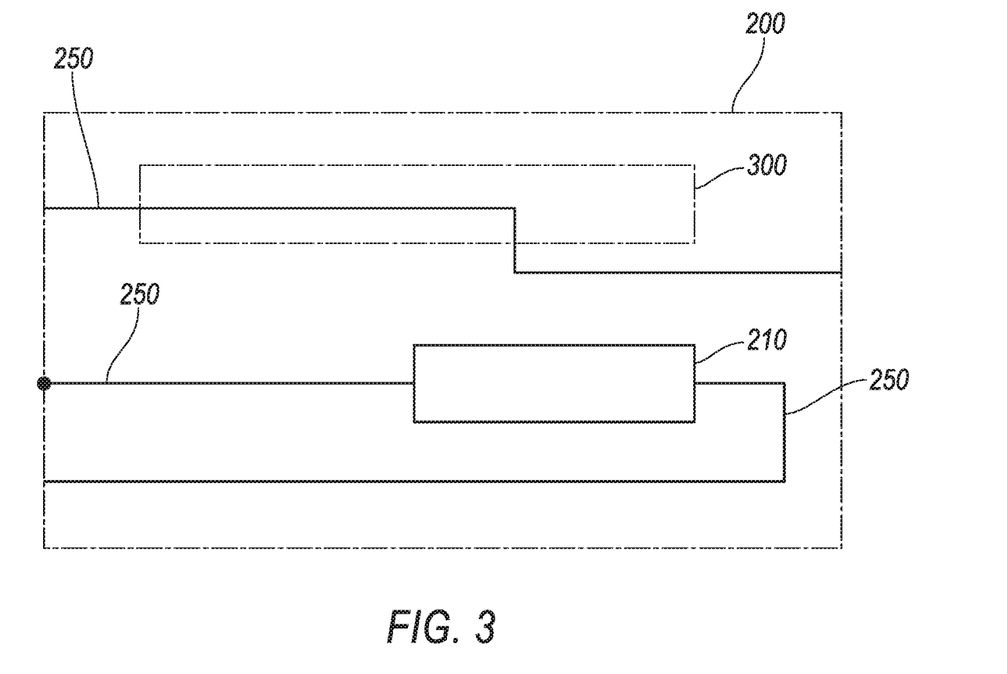
FIG. 3 shows a second example area with a temporarily non-drivable portion of an area.

Usage of an area 200 may be different based on time of day and/or day of the week. For example, a portion of the area 200 may be designated for a fresh produce market on a specific day of the week. FIG. 3 shows an example area 200 including a destination 210, input routes 250, and a temporarily non-drivable area 300. As shown in FIG. 3, a first input route 250 will be blocked when the area 300 is blocked, e.g., for an event on Sundays, whereas a second and third input routes 250 are not affected by the area 300. Thus, the metadata of the first route 250 may include time range of "Monday to Saturday", whereas the metadata of the second and third input routes 250 may have time range of "any weekday." Thus, a vehicle 105 computer 110 may not select the first input route 250 upon determining that the vehicle 105 plans to arrive in the area 200 on a Sunday.

Figure 4:
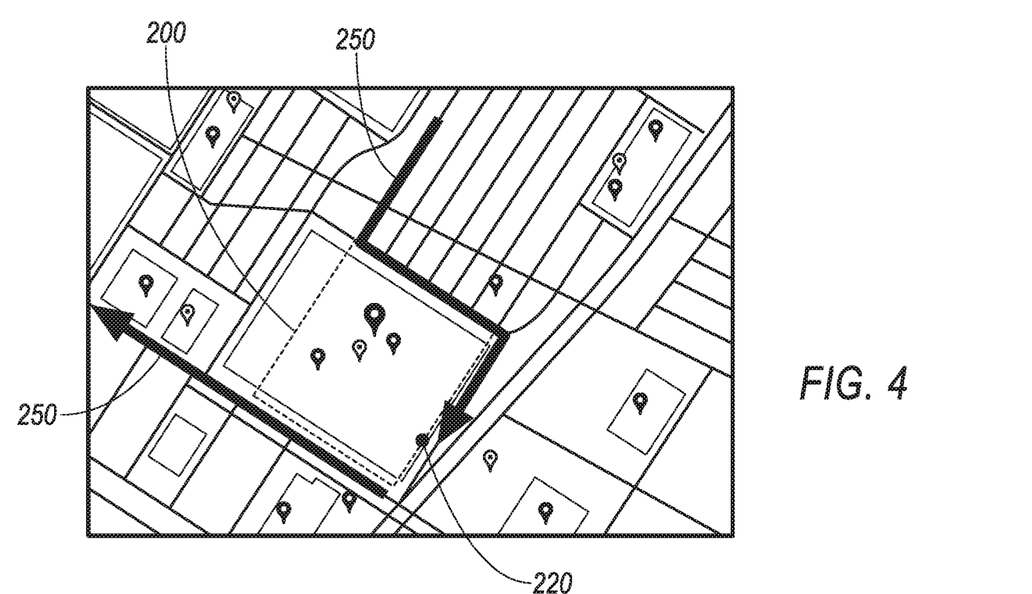
FIG. 4 shows a third example area including a structure.

FIG. 4 shows another example area 200. In this example, the area 200 substantially includes a destination 210 building, thus the area 200 may not include any drivable surface. In this example, the stored data for the area 200 may include a plurality of access points 220, e.g., valet parking entrance point 220, self-parking entrance point 220, drop-off entrance point 220. In one example, the computer 170 may store metadata for each access point 220, e.g., time range, accommodating disability, access restriction, etc. Additionally or alternatively, the computer 170 may store input routes 250 outside the area 200, e.g., public downtown area, etc., specifying input routes 250 to reach the area 200, as shown in FIG. 4.

Processing

Figure 5:
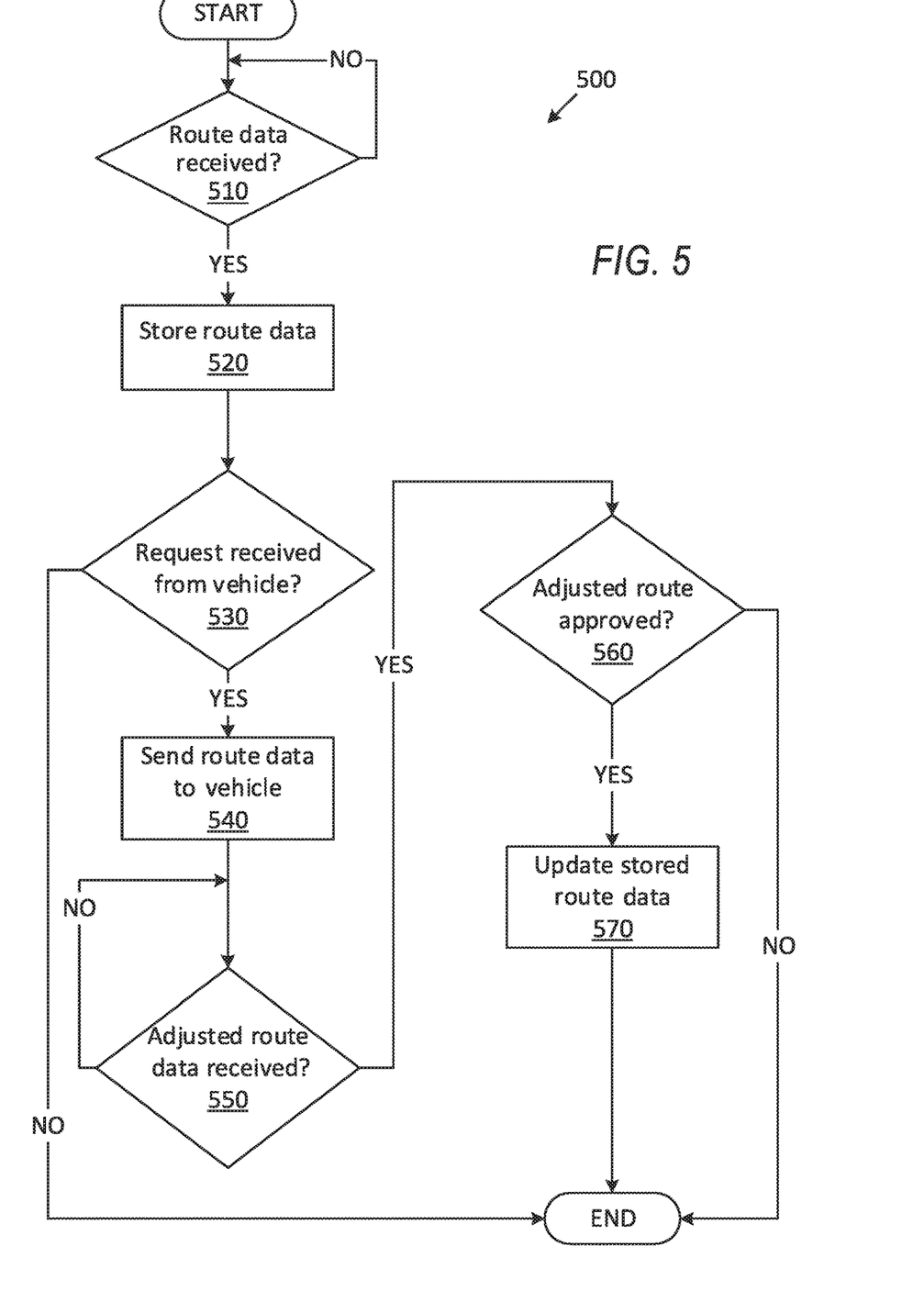
FIG. 5 is a flowchart of an exemplary process for creating and updating input routes based on received adjusted travel routes.

FIG. 5 is an example flowchart of an exemplary process 500 for creating and updating input routes 250. For example, a remote computer 170 may be programmed to execute blocks of the process 500.

The process 500 begins in a decision block 510, in which the computer 170 determines whether input route 250 data is received. For example, the computer 170 may receive input route 250 data from a remote computer 170. The computer 170 may be programmed to receive input routes 250 data including metadata (e.g., Table 3). If the computer 170 determines that the input route 250 data is received, then the process 500 proceeds to a block 520; otherwise the process 500 returns to the decision block 510.

In the block 520, the computer 170 stores the received input route 250 data, e.g., in a computer 170 memory, a cloud server, etc.

Next, in a decision block 530, the computer 170 determines whether a request for input route 250 data is received from a vehicle 105 computer 110. If the computer 110 determines that a request for route 250 data is received, e.g., via a wireless communication network 180, then the process 500 proceeds to a block 540; otherwise the process 500 ends (or alternatively returns to the decision block 610, although not shown in FIG. 5).

In the block 540, the computer 170 sends the input route 250 data to the requesting vehicle 105 computer 110, e.g., via a wireless communication network 180.

Next, in a decision block 550, the computer 170 determines whether adjusted travel route 260 data is received, e.g., from a vehicle 105 computer 110. The received data may include location coordinates of waypoints 270 on the travel routes 260 traveled by a vehicle 105. Typically, the received adjusted travel route 260 data do not include changes to the metadata of an input route 250, e.g., restriction, time, trip type, etc., stay typically unchanged. If the computer 170 determines that the adjusted travel route 260 is received, then the process 500 proceeds to a decision block 560; otherwise the process 500 returns to the decision block 550.

In the decision block 560, the computer 170 determines whether the received adjusted travel route 260 is approved. The computer 170 may be programmed to determine whether the received adjusted travel route 260 is approved based on (i) user input, and/or (ii) determining whether a distance of each waypoint 270 of the adjusted travel route 260 to a nearest waypoint 270 of the input route 250 is less than the correction threshold. Typically, a first identifier of a first input route 250 and a second identifier of an adjusted travel route 260 have are the same, i.e., the adjusted route 260 is substituted for the input route 250. If the computer 170 determines that the adjusted travel route 260 is approved, then the process 500 proceeds to a block 570; otherwise the process 500 ends, or alternatively returns to the decision block 510, although not shown in FIG. 5.

In the block 570, the computer 170 updates the input route(s) 250 data in the computer 170 memory. The computer 170 may be programmed to update location coordinates of waypoints 270 of a route 250 based on location coordinates of respective adjusted travel route 260. For example, the computer 170 may replace the location coordinates of the waypoints 270 on the input route 250 by the location coordinates of the received adjusted travel route 260. Typically, the metadata of the input routes 250 stay unchanged. Following the block 570, the process 500 ends, or alternatively returns to the decision block 510, although not shown in FIG. 5.

Figure 6:
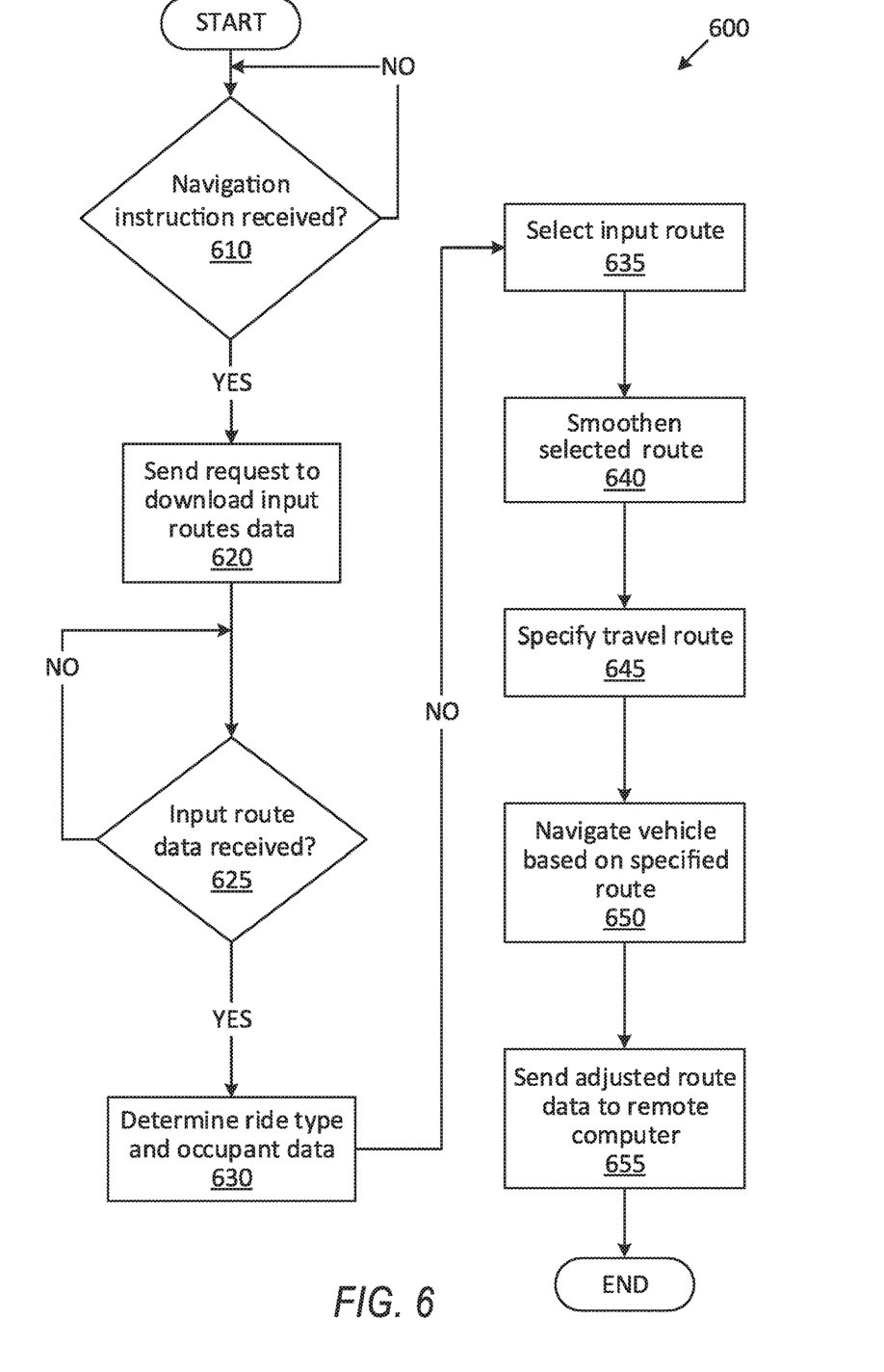
FIG. 6 is a flowchart of an exemplary process for verification and adjustment of travel routes.

FIG. 6 is an example flowchart of an exemplary process 600 for verification and adjustment of travel routes 260. For example, a vehicle 105 computer 110 may be programmed to execute blocks of the process 500.

The process 600 begins in a decision block 610, in which the computer 110 determines whether a navigation request is received. The received navigation instruction may include destination location coordinates and occupant data (e.g., Table 1). The computer 110 may be programmed to determine whether the destination of the vehicle 105 is within the area 200 (e.g., map data may include data, e.g., a flag, specifying whether a location on the map is within an area 200 that has route 250 data stored in a remote computer 170 (in other words, if the location is within area 200 that is managed by a specified user). If the computer 170 receives an instruction including location coordinates of a destination 210 in the area 200, then the process 600 proceeds to a block 720; otherwise the process 600 returns to the decision block 710.

In the block 620, the computer 110 sends a request to download the input route(s) 250 data for the area 200, e.g., via a wireless communication network 180.

In the decision block 625, the computer 110 determines whether the input route 250 data is received. The received input route(s) 250 data may be in form of example Table 3. If the computer 110 determines that the input route(s) 250 data is received, then the process 600 proceeds to a block 630; otherwise the process 600 returns to the decision block 625.

In the block 630, the computer 110 determines the trip type. For example, the computer 110 may be programmed, in accordance to an example Table 4, to determine the trip type, e.g., drive-through, based on occupant data, data received from the vehicle 105 HMI 140, sensor 130 data, etc.

Next, in a block 635, the computer 110 selects an input route 250. The computer 110 may be programmed to select an input route 250 based on the determined route parameters such as trip type, time, day of the week, occupant data, etc., the metadata of the received input route(s) 250 data, and the destination 210.

Next, in a block 640, the computer 110 may be programmed to smooth the selected input route 250, e.g., using smoothing algorithms for "line simplification" and/or "corner blending."

Next, in a block 645, the computer 110 specifies the travel route 260 based on the selected and smooth input route 250. The computer 110 may be programmed to specify a travel route 260 based on the map data (e.g., location of obstacles, sidewalk, etc.), physical properties of the vehicle 105, e.g., the minimum navigable curvature radius, etc.

Next, in a block 650, the computer 110 navigates the vehicle 105 in an autonomous mode by actuating vehicle 105 actuator(s) 120 such as propulsion, steering, and braking to traverse the specified travel route 260. Alternatively, the vehicle 105 may be navigated in semi-autonomous or non-autonomous mode, i.e., an occupant controls one or more vehicle 105 operations. The computer 110 may be programmed to navigate the vehicle 105 such that vehicle 105 moves within a specified distance (i.e., less than the correction threshold) of the travel route 260 specified based on the selected input route 250. The computer 110 may be programmed to store an adjusted travel route 260 of the vehicle 105 in a computer 110 memory. Thus, the computer 110 stores location coordinates of waypoints 270 which are on the adjusted travel route 260 in the computer 110 memory. Typically, the adjustment of the travel routes 260 does not include any changes to the metadata. In one example, the computer 110 may navigate the vehicle 105 only upon determining that the specified travel route 260 is within a specified distance of the selected input route 250. For example, the specified route 260 may deviate from the input route 250 because of an obstacle such as a traffic sign, sidewalk, etc., such that a distance of the travel route 260 from the input route 250 exceeds the specified threshold.

Next, in a block 655, the computer 110 sends the adjusted travel route 260 data to the remote computer 170. The computer 110 may be programmed to send the route identifier and location coordinates of waypoints 270 of the adjusted travel route 260 via the wireless communication network 180 to the remote computer 170. Following the block 655, the process 600 ends, or alternatively returns to the decision block 610, although not shown in FIG. 6.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer that includes a processor and a memory, the memory storing instructions executable by the processor to:
    receive one or more input routes from a user device, wherein each input route is determined by user input tracing the input route on a display of a map on the user device, and each input route is specified for at least one of a plurality of vehicle types;
    select an input route from the one or more input routes based on a determined trip type, a planned time of travel, and travel data including vehicle user data;
    specify a travel route for a vehicle, including a direction of movement of the vehicle, based on the selected input route received from the user device;
    upon determining that the vehicle specified travel route is within a specified distance of the selected input route, adjust the travel route based on vehicle sensor data, a destination of the input route, and a time of day, thereby outputting an adjusted travel route; and
    operate the vehicle based on the adjusted travel route and vehicle sensor data.

2. The system of claim 1, wherein the travel route for the vehicle is further based on metadata including at least one of the direction of movement, a time range, a weekday, an access restriction status, a parking permission status, and a vehicle type, and the instructions further include instructions to specify the metadata based on an input received from a user interface device.

3. The system of claim 2, wherein the metadata further include one or more stored trip types including at least one of a drop off, a pick-up, a drive through, accommodating a user disability, and delivering an object, and the instructions further include instructions to:
    determine the trip type for the vehicle based on user data, a detected object in the vehicle, or a received navigation instruction from a remote computer.

4. The system of claim 3, wherein each of one or more input routes is specified for a respective time range, and the instructions further include instructions to select the input route based on the respective time range of each of the one or more input routes.

5. The system of claim 2, wherein the metadata specifies a plurality of access points for a destination area, and the instructions further include instructions to select one of the plurality of entry points based on user data.

6. The system of claim 1, wherein the instructions further include instructions to adjust the travel route such that the adjusted travel route is feasible by the vehicle based on a minimum navigable steering curvature radius of the vehicle.

7. The system of claim 1, wherein the instructions to operate the vehicle on the adjusted travel route further include instructions to actuate the vehicle to deviate from the adjusted travel route, upon determining, based on the vehicle sensor data, that the adjusted travel route is not navigable.

8. The system of claim 1, wherein the instructions further include instructions to output the adjusted travel route to a user interface device and, upon receiving an approval, smooth the adjusted travel route using a smoothing technique, and store the smoothed and adjusted travel route in a remote computer.

9. The system of claim 8, further comprising a second computer, in a second vehicle, programmed to identify a second travel route to the destination within an area based on the smoothed and adjusted travel route stored in the remote computer, and further based on a time range of day, a type of the second vehicle, and to operate the second vehicle based on the second travel route.

10. The system of claim 1, wherein each of the one or more input routes includes (i) location coordinates of a plurality of waypoints, and (ii) route-based metadata including a direction of movement, a time range, and one or more trip types.

11. The system of claim 1, wherein the instructions further include instructions to specify the travel route for the vehicle based on a minimum navigable steering curvature radius of the vehicle, and to navigate the vehicle based on the travel route while deviating from the travel route, to avoid an obstacle, based on object detection sensor data received from a vehicle sensor.

12. A method, comprising:
receiving one or more input route from a user device, wherein each input route is determined by user input tracing the input route on a display of a map on the user device and each input route is specified for at least one of a plurality of vehicle types;
selecting an input route from the one or more input routes based on a determined trip type, a planned time of travel, and travel data including vehicle user data;
specifying a travel route for a vehicle, including a direction of movement of the vehicle, based on the selected input route received from the user device;
upon determining that the vehicle specified travel route is within a specified distance of the selected input route, adjusting the travel route based on vehicle sensor data, a destination of the input route, and a time of day, thereby outputting an adjusted travel route; and
operating the vehicle based on the adjusted travel route and vehicle sensor data.

13. The method of claim 12, further comprising specifying metadata of the specified travel route based on an input received from a user interface device, wherein the travel route for the vehicle is further based on the metadata including at least one of the direction of movement, a time range, a weekday, an access restriction status, a parking permission status, and a vehicle type.

14. The method of claim 13, further comprising:
determining the trip type for the vehicle based on user data, a detected object in the vehicle, or a received navigation instruction from a remote computer,
wherein the metadata further include one or more stored trip types including at least one of a drop off, a pick-up, a drive through, accommodating a user disability, and delivering an object.

15. The method of claim 14, wherein each of the input routes is specified for one or more types of vehicles and time ranges.

16. The method of claim 12, further comprising adjusting the travel route such that the adjusted travel route is feasible by the vehicle based on a minimum navigable steering curvature radius of the vehicle.

17. The method of claim 12, further comprising operating the vehicle on the adjusted travel route by actuating the vehicle to deviate from the adjusted travel route, upon determining, based on the vehicle sensor data, that the adjusted travel route is not navigable.

18. The method of claim 12, further comprising outputting the adjusted travel route to a user interface device and, upon receiving an approval, smooth the adjusted travel route using a smoothing technique, and store the smoothed and adjusted travel route in a remote computer.

* * * * *